United States Patent
Friedrichs et al.

(10) Patent No.: US 9,863,821 B2
(45) Date of Patent: Jan. 9, 2018

(54) CALIBRATOR FOR CALIBRATING DEVICES WITH A TEMPERATURE FUNCTION

(71) Applicant: SIKA Dr. Siebert & Kühn GmbH & Co. KG, Kaufungen (DE)

(72) Inventors: René Friedrichs, Göttingen (DE); Michael Göldner, Hessisch-Lichtenau (DE)

(73) Assignee: SIKA Dr. Siebert & Kühn GmbH & Co. KG, Kaufungen (DE)

( * ) Notice: Subject to any disclaimer, the term of this patent is extended or adjusted under 35 U.S.C. 154(b) by 722 days.

(21) Appl. No.: 14/256,000

(22) Filed: Apr. 18, 2014

(65) Prior Publication Data

US 2014/0314115 A1    Oct. 23, 2014

(30) Foreign Application Priority Data

Apr. 18, 2013   (EP) .................... 13002049

(51) Int. Cl.
*G01K 15/00* (2006.01)
*G06F 3/044* (2006.01)
*G06F 3/0488* (2013.01)

(52) U.S. Cl.
CPC .......... *G01K 15/002* (2013.01); *G01K 15/00* (2013.01); *G01K 15/005* (2013.01); *G06F 3/044* (2013.01); *G06F 3/0488* (2013.01)

(58) Field of Classification Search
USPC ................................. 374/1, 141, 3
See application file for complete search history.

(56) References Cited

U.S. PATENT DOCUMENTS

| | | | |
|---|---|---|---|
| 6,709,152 B1* | 3/2004 | Bronlund | G01K 15/00 374/1 |
| 7,677,794 B2* | 3/2010 | Kim | G01K 15/002 374/1 |
| 7,785,000 B2 | 8/2010 | James et al. | |
| 2008/0055265 A1* | 3/2008 | Bewley | G06F 3/04886 345/173 |
| 2009/0003406 A1* | 1/2009 | Sjogren | H01H 69/01 374/1 |
| 2009/0296769 A1 | 12/2009 | Fiennes et al. | |
| 2010/0194692 A1* | 8/2010 | Orr | G06F 3/0414 345/173 |
| 2010/0321304 A1* | 12/2010 | Rofougaran | G06F 3/046 345/173 |
| 2012/0267203 A1* | 10/2012 | Friedli | B66B 1/34 187/388 |
| 2012/0274604 A1* | 11/2012 | Norton | H03K 17/962 345/174 |
| 2012/0313767 A1* | 12/2012 | Sitarski | B60K 35/00 340/425.5 |
| 2014/0136135 A1* | 5/2014 | Drukier | G01T 7/005 702/94 |
| 2014/0180613 A1* | 6/2014 | Banhegyesi | G01R 22/065 702/61 |
| 2015/0220209 A1* | 8/2015 | Nys | G01R 35/005 345/174 |

* cited by examiner

*Primary Examiner* — Mirellys Jagan
(74) *Attorney, Agent, or Firm* — Dinsmore & Shohl LLP

(57) ABSTRACT

A calibrator for calibrating devices with a temperature function, e.g. thermometers or thermal switches has an input and display unit. The calibrator has a capacitive touchscreen with the input and display unit.

10 Claims, 1 Drawing Sheet

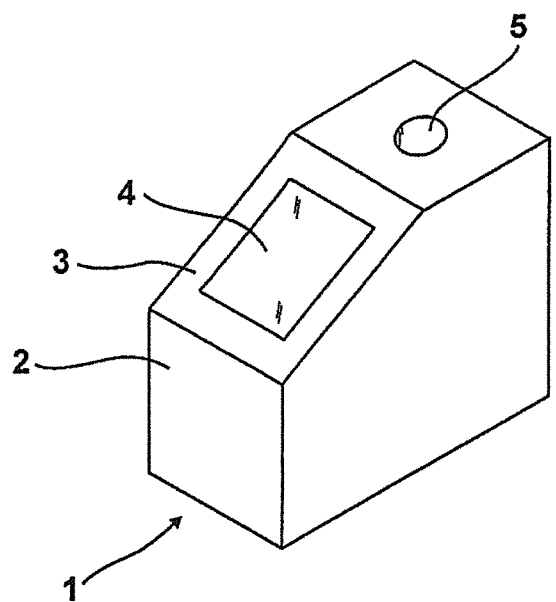

CALIBRATOR FOR CALIBRATING DEVICES WITH A TEMPERATURE FUNCTION

CROSS REFERENCE TO RELATED APPLICATIONS

This application claims priority of European Patent Application No. EP 13 002 049.8, filed Apr. 18, 2013, the content of which is incorporated herein in its entirety.

FIELD OF THE INVENTION

The invention relates to a calibrator for calibrating devices with a temperature function, e.g. thermometers or thermal switches with an input and display unit.

BACKGROUND OF THE INVENTION

The function of a calibrator consists in heating up or cooling down the accommodation area of a thermometer or a thermal switch to a temperature that has been predetermined by the user and to keep that temperature constant over a certain period of time. To this end, it is necessary to input certain information into the calibrator or the control and regulation unit of the calibrator, such as e.g. the target temperature or the adjustment parameters for adjusting the temperature to a predetermined level. In order to input such information, it is known to provide a certain number of keys on the calibrator, which can be located on one or several key panels. During the calibration process or when inputting the data, it is necessary to display the relevant data. To this end, it is known to provide a display on the calibrator. Thus, it must be kept in mind that the calibrator comprises two different communication devices in order to allow the user to input and control data.

This has several disadvantages. For instance, it must be noted that easily readable input and output units require a relatively large surface area on the calibrator, which is not often available. In addition, disposing more specifically displays on a calibrator is often limited by the fact that such displays can only be mounted on the housing of the calibrator in places where the temperature is not too high. In addition, regional and more specifically language-specific configurations of the input unit, e.g. keys with Arabic or Chinese characters, also imply different hardware, which leads to higher costs due to the plurality of different calibrator embodiments. In addition, it must be noted that mechanical keyboards for inputting the data for the calibration process wear out more or less quickly due to use, the term wear also referring to the fact that the lettering of the keys wears out, which can lead to misuse.

SUMMARY OF THE INVENTION

The problem underlying the invention therefore consists in finding a remedy to this disadvantage. More specifically, the input and display unit must be easily readable, the characters of the input and display unit must be viewable in any language and the input and display unit must additionally be configured so as to be free from wear.

In order to solve the problem, it is proposed according to the invention to provide a calibrator for calibrating devices with a temperature function, such as e.g. thermometers and switches, with a capacitive touchscreen with at least one input unit and one display unit. As opposed to a resistive touchscreen, such a capacitive touchscreen has the advantage that it is resistant to external influences. In this context it must also be pointed out that silicone oils, which attack the coating of a resistive touchscreen, usually a polyester layer, are often used in calibration baths for calibrators. In addition, a plastic surface is relatively scratch-sensitive. A capacitive touchscreen has a glass surface, which is resistant to silicone oil and is substantially scratch-resistant.

However, such a capacitive touchscreen has the disadvantage of being highly susceptible to electromagnetic waves. The electromagnetic susceptibility of such a touchscreen can go so far that values that have been input for the calibration process are modified. In order to reduce the susceptibility to electromagnetic disruptions during the calibration process, it is provided according to one particular feature of the invention that the input unit is at least partially deactivated or secured during the calibration process. The activation or deactivation of the input unit can be achieved in different manners. On the one hand, it is possible to provide a non-deactivatable keypad on the touchscreen, by way of which the activation or the deactivation of the input unit is carried out. In addition, it is possible to provide the touchscreen with a timer, the input unit being at least partially switched into a deactivated or secured mode after a predetermined time period during which no data has been input. The combination of a keypad for activating and deactivating the input unit with a timer is also conceivable, which means that if no data is input into the input unit within a certain time period, the input unit is automatically deactivated. Activating the input unit then either also occurs automatically after completion of the calibration process or manually by way of a keypad on the touchscreen that is not deactivated.

According to another embodiment, the touchscreen can be touched in two places simultaneously or with a time lag in order to activate or deactivate the input unit. Such a two-handed operation more specifically prevents an unintended activation of the input unit. The same applies to an alternative in which the touchscreen is constantly and/or repeatedly touched over a longer time period in one or several places for activation or deactivation.

The input unit is preferably configured as a control panel with individual keypads on the touchscreen.

In order to obtain an overview of the input data when inputting the data for the calibration process, the input and the display unit can be displayed in parallel on the touchscreen.

It is also conceivable to display the data in a substantially magnified manner on the display unit of the touchscreen during the deactivation of the input unit, whereas during input of data into the input unit, the data is not displayed by the display unit or displayed in a substantially reduced manner. This means that respectively in those places where an active operation is implemented on the touchscreen, or where the touchscreen has only one function, namely for instance displaying data during the calibration process, the keypads for input are displayed in a substantially magnified manner or the data is displayed in a magnified manner during the calibration process. As has already been explained, this can occur in parallel, wherein the input unit or the display unit having the highest priority is shown in the accordingly magnified view.

According to an advantageous feature of the invention it is additionally provided that the processing unit of the touchscreen implements the temperature regulation.

The invention is exemplarily described in more detail based on the drawings.

BRIEF DESCRIPTION OF THE DRAWINGS

FIG. 1 is a perspective view of an embodiment of a calibrator in accordance with the present invention.

DETAILED DESCRIPTION OF THE INVENTION

FIG. 1 shows a calibrator 1, the calibrator 1 having a calibrator housing 2, an accommodation 5 for devices with a temperature function, and an inclined surface 3. A touchscreen 4 is disposed on the inclined surface 3. The touchscreen 4 can be configured as an input unit, as a display unit or as a combination of an input unit and a display unit, the differences in size between the input unit on the one hand and the display unit on the other hand depending on whether the calibrator is in a calibration mode or in an input mode.

LIST OF REFERENCE NUMBERS 1 calibrator
2 calibrator housing
3 surface on the calibrator housing
4 capacitive touchscreen
5 accommodation for devices with a temperature function

The invention claimed is:

1. A calibrator for calibrating devices with a temperature function, comprising:
   a calibration housing; and
   an input and display unit including a capacitive touchscreen on the calibration housing,
   wherein an input portion of the input and display unit is at least partially deactivated during a calibration process.

2. A calibrator in accordance with claim 1, wherein the capacitive touchscreen includes a keypad, the keypad having a portion that is not deactivatable, the portion that is not deactivatable being operable to deactivate or activate a remainder of the input portion.

3. A calibrator in accordance with claim 1, wherein an input portion of the input and display unit is a control panel on the touchscreen, the control panel having individual keys.

4. A calibrator in accordance with claim 1, wherein an input portion and a display portion of the input and display unit are displayed in parallel on the capacitive touchscreen during input of data.

5. A calibrator in accordance with claim 1, wherein when the input portion of the input and display unit is at least partially deactivated, data is displayed on a display portion of the touchscreen in a substantially magnified form; and
   when the input portion is not at least partially deactivated and data is being input into the input portion, data is not displayed on the display portion or is displayed in a substantially reduced form on the display portion.

6. A calibrator in accordance with claim 1, further comprising a timer, wherein at the end of a predetermined time period, in which no data has been input, the input portion is at least partially deactivated.

7. A calibrator in accordance with claim 1, wherein the input portion is at least partially deactivated by touching the touchscreen in two places simultaneously or with a time lag.

8. A calibrator in accordance with claim 1, wherein the input portion is at least partially deactivated by touching the touchscreen continuously or repeatedly in one or more places over a longer time period.

9. A calibrator in accordance with claim 1, wherein the touchscreen has a processing unit and the processing unit is operable to regulate the temperature of the calibrator.

10. A calibrator for calibrating devices with a temperature function operated with a calibration bath of silicone oil, comprising:
    a calibration housing with the calibration bath of silicone oil; and
    an input and display unit including a capacitive touchscreen on the calibration housing,
    wherein an input portion of the input and display unit is at least partially deactivated during a calibration process.

* * * * *